United States Patent [19]

Gleasman et al.

[11] Patent Number: 4,724,721

[45] Date of Patent: Feb. 16, 1988

[54] SUBASSEMBLY FOR A DIFFERENTIAL

[75] Inventors: Vernon E. Gleasman, Pittsford; Keith E. Gleasman, Fairport, both of N.Y.

[73] Assignee: The Gleason Works, Rochester, N.Y.

[21] Appl. No.: 869,541

[22] Filed: Jun. 2, 1986

[51] Int. Cl.⁴ .............................................. F16H 1/38
[52] U.S. Cl. ...................................... 74/715; 74/710
[58] Field of Search ............... 74/606 R, 710, 713, 74/714, 715, 665 GD, 607

[56] References Cited

U.S. PATENT DOCUMENTS

| | | | |
|---|---|---|---|
| 1,164,770 | 12/1915 | Walter | 74/715 |
| 1,195,314 | 8/1916 | Williams | 74/715 |
| 1,273,957 | 7/1918 | Ungar | 74/715 |
| 1,297,954 | 3/1919 | Williams | 74/714 |
| 1,373,657 | 4/1921 | Finefrock | 74/715 |
| 2,022,141 | 11/1935 | Morgan | 74/715 |
| 2,559,916 | 7/1951 | Gleasman | 74/715 |
| 2,631,475 | 3/1953 | Gleasman | 74/715 |
| 2,823,559 | 2/1958 | Ransom | 74/715 |
| 2,859,641 | 11/1958 | Gleasman | 74/715 |
| 3,884,096 | 5/1975 | Gleasman | 74/715 |
| 4,084,450 | 4/1978 | Conroy | 74/713 |
| 4,182,201 | 1/1980 | Mayhew et al. | 74/713 |
| 4,183,263 | 1/1980 | Osenbaugh | 74/606 R |
| 4,232,569 | 11/1980 | Hauser et al. | 74/713 X |

Primary Examiner—Leslie Braun
Assistant Examiner—Martin G. Belisario
Attorney, Agent, or Firm—Thomas B. Ryan; Ralph E. Harper; Morton A. Polster

[57] ABSTRACT

A combination gear subassembly (50, 60, 90, or 130) for mounting pairs of combination gears (38, 70, 100, or 120) in a differential assembly having cross axis compound planetary gearing. The combination gear subassemblies are made up of a pair of combination gears together with a pair of journal plates (52, 62, or 92) each having a pair of bearing surfaces (54, 64, or 98) for receiving journals (46, 72, 102, or 122) which project from opposite ends of the combination gears. The combination gear subassemblies are mounted in guide slots (32, 66, or 116) formed in pedestals (28, 84 or 112) which connect end portions (12) of housing (10).

14 Claims, 12 Drawing Figures

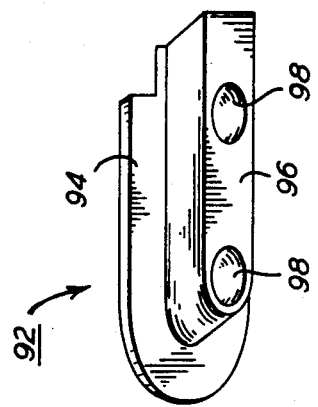
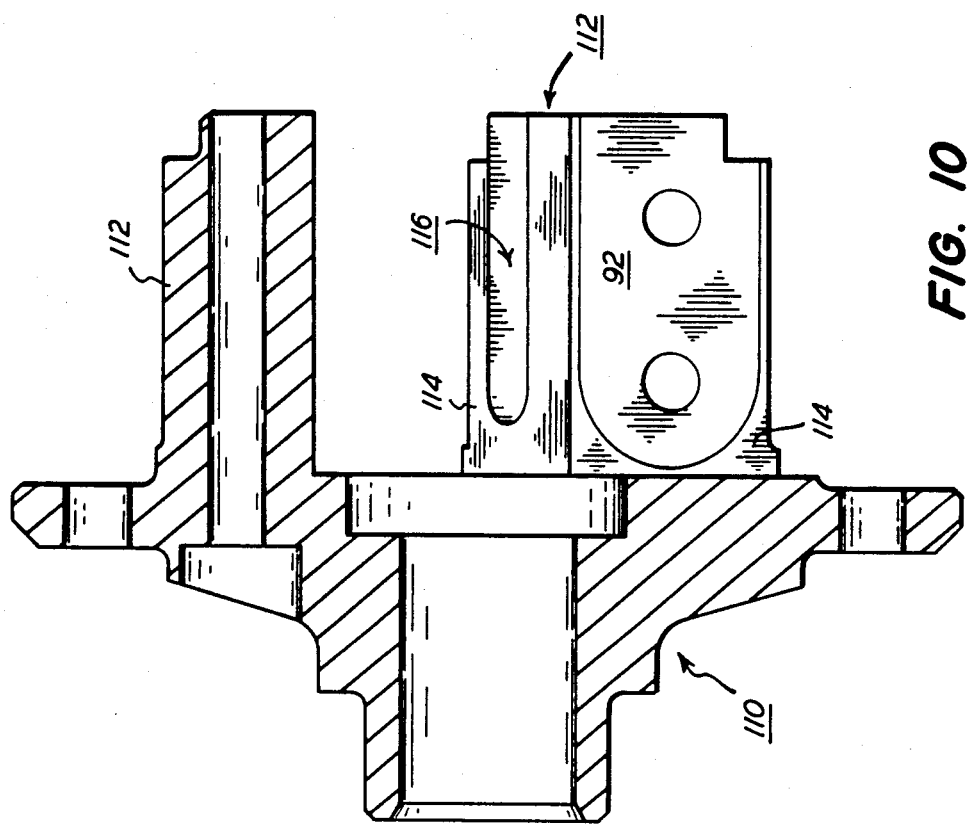

SUBASSEMBLY FOR A DIFFERENTIAL

BACKGROUND OF THE INVENTION

The present invention relates to differential gear assemblies having an improved arrangement for mounting gear pairs.

A differential gear assembly of a type contemplated for use in the present invention is disclosed in U.S. Pat. No. 2,859,641 to V. E. Gleasman (co-inventor of present invention). The patent discloses a differential mechanism which may be mounted, for example, in the drive train of a motor vehicle between drive axles. The differential mechanism includes side gears in the form of worm gears coupled to inner ends of each drive axle together with combination gears having central worm wheel portions in mesh with the side gears and spur gear portions at either end in mesh with each other for transferring and dividing torque between the drive axles. The combination gears are provided in groups of one or more pairs, and each combination gear of a pair rotates on an axis of rotation that is substantially perpendicular to a common axis of rotation about which the side gears rotate. Ends of each combination gear terminate in stub shafts which are supported in bearings formed in removable posts or pedestals. A housing which is rotatable about the drive axles is provided with a flange at one end and a cap at the other end for securing the removable pedestals in the housing. A ring gear is attached at the flanged end of the housing for connecting the assembly to a power source.

This type of differential assembly may be referred to as a "cross axis compound planetary differential." Although the just-described differential works quite well, it is difficult to assemble and costly to manufacture. In order to install combination gears within the differential assembly, the housing must be disassembled to permit adjustment of the removable pedestals along the stub shafts. All of the combination gears must be simultaneously mounted between their associated pedestals before they can be installed in the housing. The removal or replacement of a single combination gear requires the assembly to be substantially disassembled, thereby disturbing previously established mounting positions of the other combination gears. In addition, extensive machining operations are required to permit accurate mounting of the removable pedestals within the assembly. These operations add considerable cost to the manufacture of the above-described device.

U.S. Pat. No. 2,631,475 to the same V. E. Gleasman discloses an earlier version of a cross axis compound planetary differential design which features a cartridge unit for simultaneously installing two pairs of combination gears within a differential housing. Both pairs of combination gears are mounted between end plates of a single cartridge unit. The combination gears in this prior design include a central worm gear portion and the side gears take the form of worm wheels. Each combination gear also includes a through bore for receiving a mounting shaft which is supported in bearings formed in end plates of the cartridge unit. A housing is provided with a removable end cap to permit insertion of the cartridge unit within the housing.

Although this design permits relatively easy assembly, the design was abandoned in favor of the first-discussed design of U.S. Pat. No. 2,859,641 on account of strength considerations. The use of cartridge end plates straddling the side gears required removal of excessive amounts of housing stock leaving little material with which to attach a housing end cap. It may also be noted that only two pairs of combination gears could be accommodated in the cartridge design. This consideration also limited the amount of torque which could be conveyed by the design.

A more recent cross axis compound planetary differential in current use and featuring a combination gear mounting design is disclosed in U.S. Pat. No. 3,884,096, also to V. E. Gleasman. The combination gears include worm wheel and spur gear portions and the side gears take the form of worm gears as first described above for U.S. Pat. No. 2,859,641. Similar to next-described U.S. Pat. No. 2,631,475, the combination gears also include through bores for receiving mounting shafts. A housing is provided with fixed pedestals which are spaced apart from each other and have parallel opposing faces for locating combination gear pairs within the housing. The mounting shafts extend into bearings formed through the parallel faces of adjacent pedestals and are retained in the housing by pins fastened at the exterior of the housing.

The design of U.S. Pat. No. 3,884,096 provides for the individual mounting of combination gears between parallel faces of adjacent pedestals which are formed integrally with one end of a differential housing. Although such a design possesses adequate strength, the mounting of combination gears individually is quite time consuming. In addition, carefully aligned and costly bores are required to be formed through the housing to permit the mounting of combination gears individually within the housing. Special pin arrangements are also required to retain the mounting shafts within the assembly. The failure of one of these pin arrangements could lead to an undesirable situation in which a mounting shaft released from the housing becomes jammed between other drive line components.

SUMMARY OF THE INVENTION

The present invention provides improved means for accurately mounting combination gear pairs within a cross axis compound planetary differential. This new design provides for ease of assembly without sacrificing housing strength. Also, a minimum of machining operations are required by the design of the present invention to promote economy of manufacture.

These advantages are obtained by use of combination gear subassemblies in cooperation with a specially modified housing for receiving the subassemblies. Each combination gear subassembly comprises a pair of combination gears having journals projecting from opposite ends of the gears and a pair of journal plates having bearing surfaces for receiving the journals which are mounted at the opposite ends of the combination gear pair. The bearing surfaces formed in the journal plates are accurately spaced so that the members of each pair of combination gears are maintained in mesh with each other. A differential housing is specially adapted to receive the novel combination gear subassemblies. The housing includes conventional features including a removable end cap and fixed pedestals having opposing parallel faces spaced about the intermediate section of the housing. In accordance with the present invention, the pedestals also include guide slots formed in the opposing faces along the length of the pedestals for receiving the combination gear subassemblies. The combination gear subassemblies may be inserted between guide slots through one end of the housing and secured in place by replacing the end cap.

In a preferred embodiment, combination gear subassemblies include pairs of substantially flat journal plates for accurately spacing and rotatively supporting pairs of enmeshed combination gears. The flat journal plates may be constructed from sheet material in which the outer profile and bearings of the journal plates may be formed by stamping or other similar known processes. Shallow longitudinal guide slots are formed in the opposing faces of the housing pedestals to support the combination gear subassemblies in predetermined positions within the housing. The preferred embodiment also includes journals which are integrally formed at the ends of the combination gears. The flat journal plates are slightly oversized in thickness with respect to the length of the journals to serve as thrust washers between remaining end faces of the combination gears which surround the journals and bottom surfaces of the guide slots to restrict axial movement of the combination gears when mounted in the housing.

In a second embodiment, combination gear subassemblies also include pairs of substantially flat, journal plates for mounting combination gear pairs with journals which are integrally formed at the ends of the combination gears. However, end surfaces of the journals rather than the remaining end faces of the combination gears are used as thrust surfaces. Journals of this second embodiment are sized in length with respect to the thickness of the journal plates so that the end surfaces of the journals extend beyond the journal plates and into contact with bottom surfaces of the guide slots thereby restricting endwise movement of the combination gears. This embodiment also includes pockets or wells formed in the journal end surfaces for accumulating and dispersing lubricant at thrust interfaces. The pockets are connected to a lubricant source by a conduit formed through the pedestals.

A third embodiment of the present invention involves use of combination gear subassemblies which include journal plates having a "T-shaped" cross-section for mounting combination gear pairs. The T-shaped journal plates include a thin peripheral surface which serves as a thrust washer between combination gear end faces and the opposing faces of adjacent pedestals. Narrow guide slots are formed in the opposing faces along the length of the pedestals to capture center portions of the T-shaped journal plates in place with the housing. The center portions of the T-shaped journal plates are made of increased thickness over the peripheral portion to reinforce journal plate bearing surfaces while accurately positioning combination gear pairs in the housing.

The T-shaped journal plate described above permits use of combination gear journals formed integrally as part of the combination gear or as part of a mounting shaft passing through a bore formed in the combination gear. In the third embodiment, combination gear pairs with integral journals are captured between the T-shaped journal plates. Alternatively, in a fourth embodiment, the combination gears are mounted for rotation on shafts which pass through the combination gears. The shafts include journals formed at both ends which are carried between a pair of T-shaped journal plates.

These and other features and advantages of the invention will become apparent in the more detailed discussion which follows. In that discussion reference will be made to the accompanying drawings as briefly described below.

BRIEF DESCRIPTION OF DRAWINGS

FIG. 10 is sectional view of the differential housing taken along line 10—10 of FIG. 9 with a single journal plate mounted in place;

FIG. 11 is an isometric view of the journal plate of the third embodiment shown in FIGS. 8-10.

DETAILED DESCRIPTION OF THE INVENTION

Figure 1:
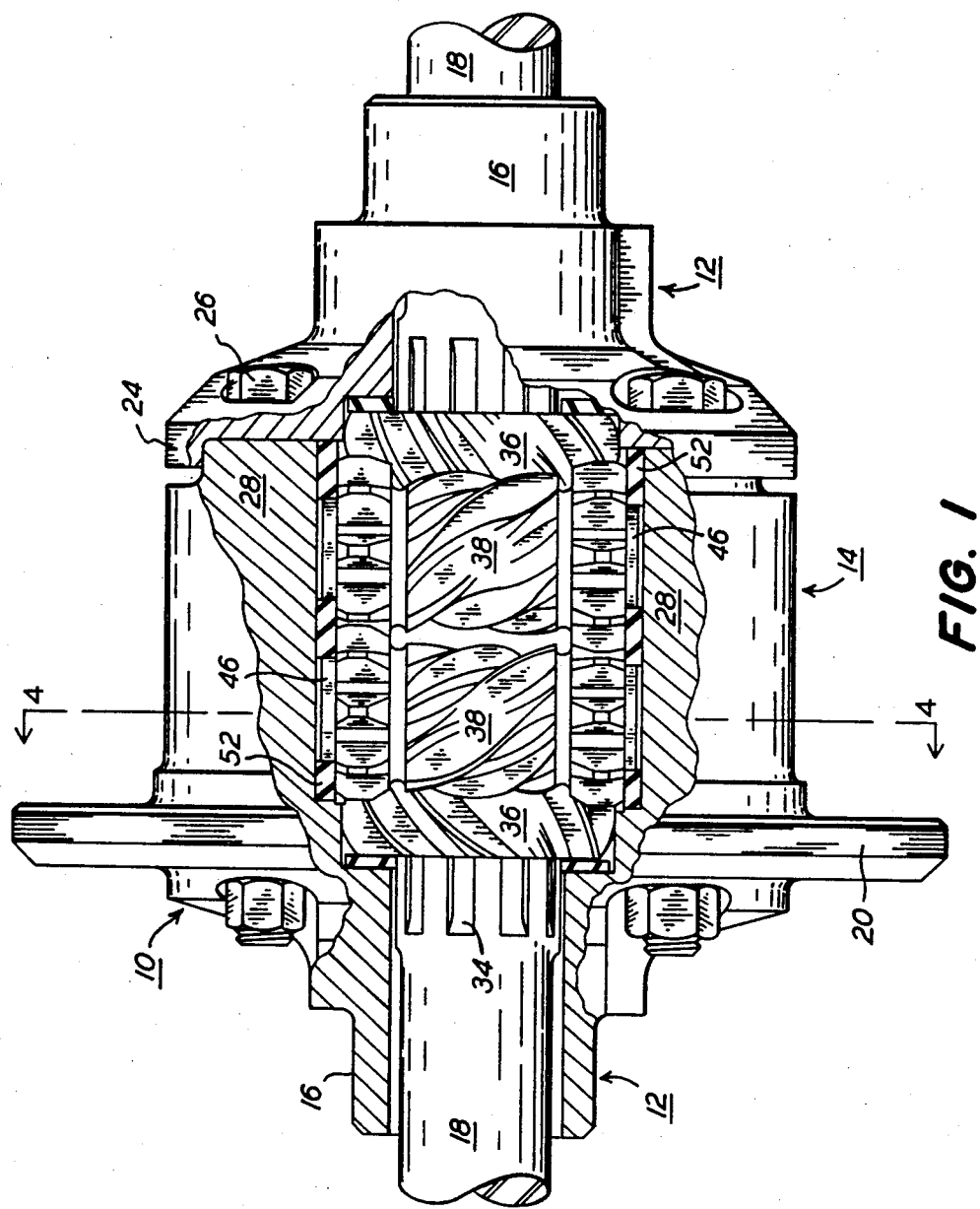
FIG. 1 is a cut away elevation view of the preferred embodiment of the differential assembly of the present invention.
Figure 2:
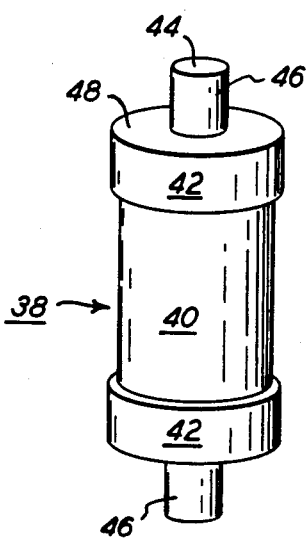
FIG. 2 is a schematic outline of a combination gear for use in the present invention.
Figure 3:
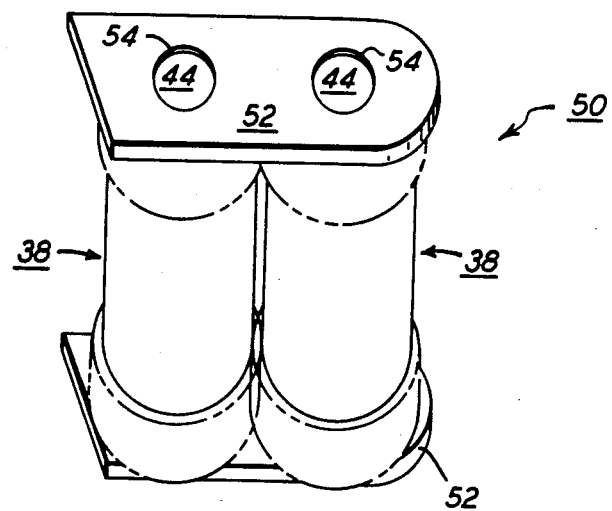
FIG. 3 is an isometric view in schematic outline of the combination gear subassembly of the present invention.
Figure 4:
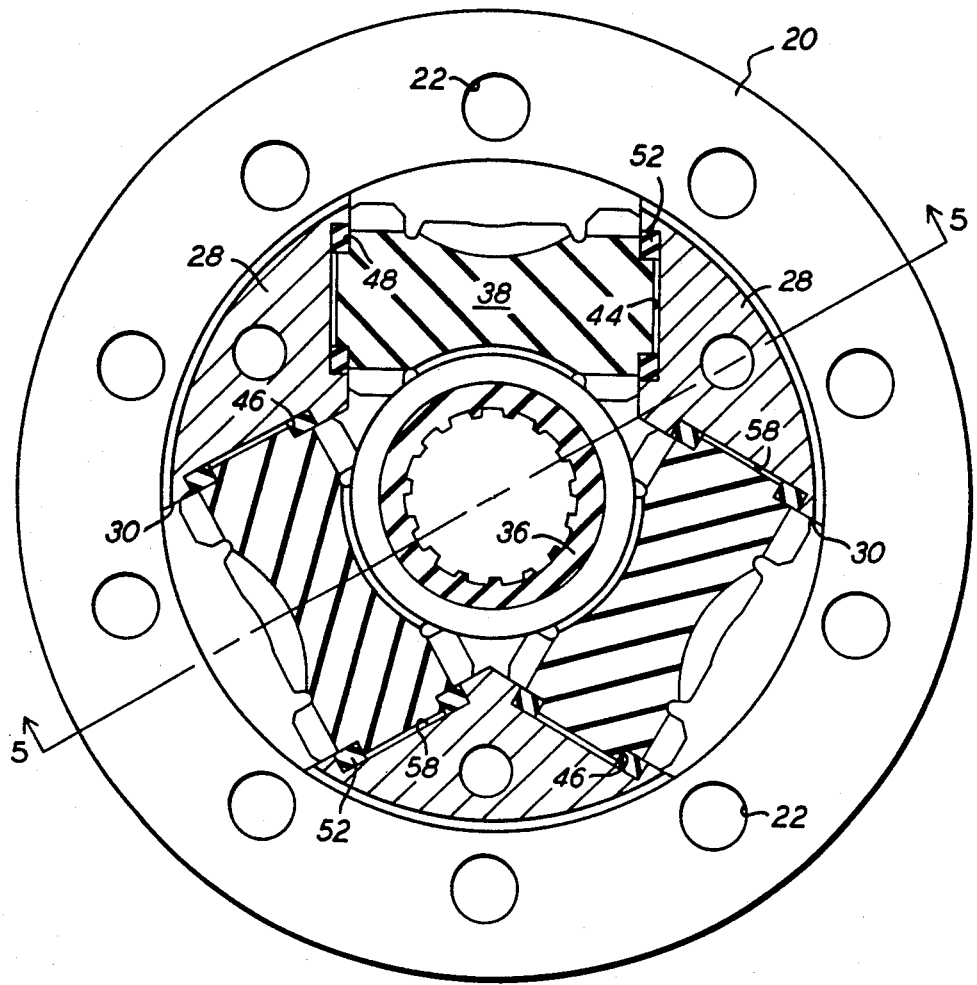
FIG. 4 is an end view partly in cross section of the preferred differential assembly as seen in a plane indicated by line 4—4 of FIG. 1.
Figure 6:
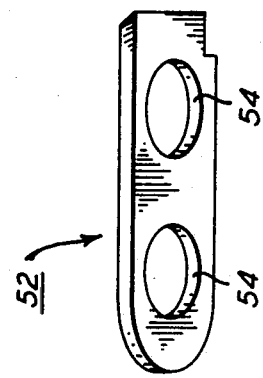
FIG. 6 is an isometric view of the journal plate shown in FIG. 5.
Figure 5:
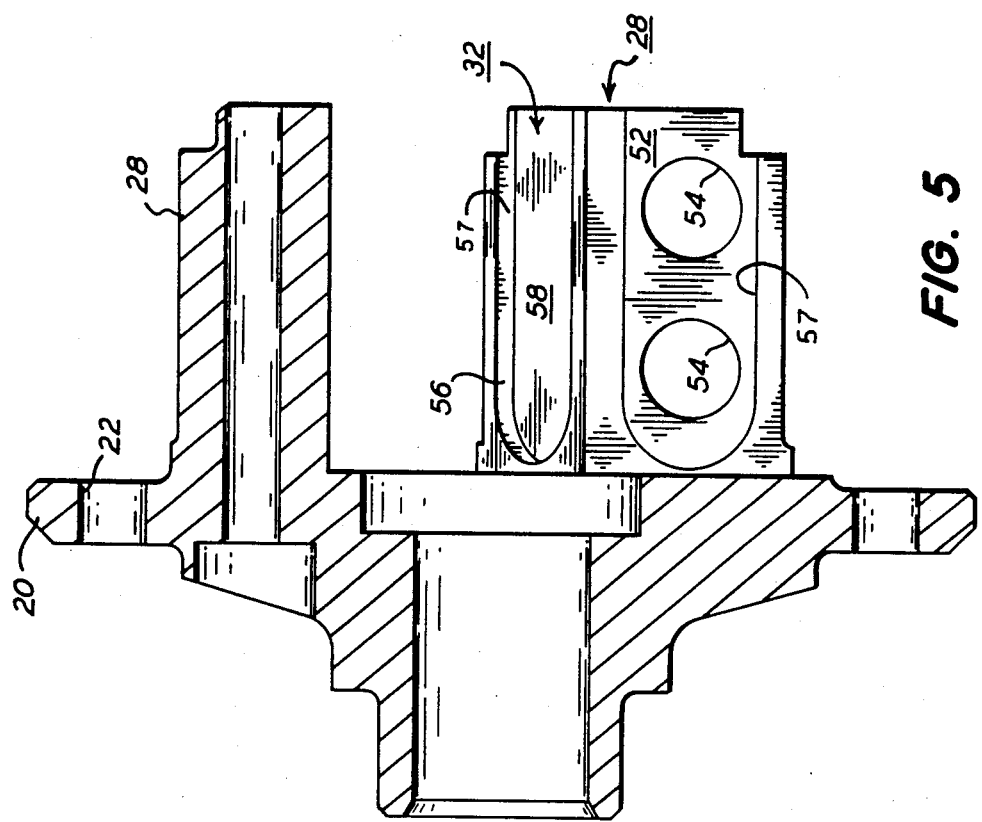
FIG. 5 is sectional view of the differential housing taken along line 5—5 of FIG. 4 with a single journal plate mounted in place.

The improved differential assembly in its preferred embodiment is shown in FIGS. 1 through 6. The preferred assembly includes a housing 10 having end portions 12 disposed on either side of an intermediate portion 14. Both end portions 12 include trunnions 16 for rotatively mounting the housing 10 about drive axle ends 18 which extend into engagement with internal gear components.

One end portion 12 (shown at left in FIG. 1) also includes a flange 20 that includes a plurality of apertures 22 by which a ring gear (not shown) is mounted to the differential housing. The other end portion 12 (shown at right in FIG. 1) includes a removable end cap 24 which is attached to the housing intermediate portion 14 by means of bolts 26.

The housing intermediate portion 14 is located between end portions 12 and is formed to include a plurality of pedestals 28 having opposing parallel faces 30 (FIG. 4) defined between adjacent pedestals. According to the invention, guide slots 32 (FIG. 5) having side walls 57 and bottom surface 58 are formed in the opposing faces 30 and extend in the lengthwise direction of the pedestals 28.

The housing 10 is also adapted to support a train of internal gear components. As shown in FIG. 1, axle ends 18 which extend into the housing are provided with splines 34 for rotatively coupling side gears 36 to the axle ends 18. Each of the side gears 36 associated with a respective axle end 18 is in mesh with one or more combination gears 38 which, in turn, are also in mesh with each other for operatively connecting the side gears 36. Thus, the combination gears 38 are grouped in pairs (and in accordance with the preferred embodiment, three pairs are shown) with each combination gear of a pair associated with a one or the other side gear 36.

Each combination gear 38 (shown schematically in FIG. 2) is comprised of a central worm wheel portion 40 for meshing with one of the two side gears and spur gear portions 42 located at each end thereof for meshing with the spur gear portion of another combination gear 38 of a pair. In accordance with the preferred embodiment, integral journals 46 project from end faces 48 of the combination gears 38. The journals terminate in end surfaces 44.

Novel combination gear subassemblies 50 (shown schematically in FIG. 3) are also defined in the preferred embodiment of the present invention as comprising a pair of journal plates 52 mounted at opposite ends of a pair of combination gears 38. Each journal plate 52 includes a pair of bearing surfaces 54 formed therein for receiving journals 46. The bearing surfaces 54 are spaced apart so that paired combination gears 38 of combination gear subassembly 50 are maintained in mesh with each other. The journal plates also serve as thrust washers between end faces 48 of the combination gears and bottom surfaces 58 (FIGS. 4 and 5) of guide slots 32 for restricting axial movement of the combination gears in the housing.

Journal plates 52 (shown isometrically in FIG. 6) are preferably composed of thin sheet material in which both the outer profile of the journal plates 52 and bearing surfaces 54 may be formed by well known stamping processes. Use of these processes promotes economy of manufacturing the journal plates. Surfaces of the journal plates may also be treated with known metalurgical processes for improving friction and wear characteristics.

As a further feature of the preferred embodiment of the present invention, differential housing 10 is specially adapted to receive combination gear subassemblies 50. As mentioned above, guide slots 32 are formed in opposing faces 30 of adjacent pedestals 28 and are sized to receive journal plates 52 between side walls 57 in predetermined positions with respect to housing 10. Removal of end cap 24 exposes one end of slots 32. Combination gear subassemblies 50 may then be inserted in housing 10 between pairs of opposing guide slots 32 aligned in a lengthwise direction of adjacent pedestals 28. One end of each journal plate 52 is specially shaped to match radiused end 56 (FIG. 5) of slots 32 formed by the end track of a rotary tool which may be used for machining slots 32 in housing 10. The other end of journal plates 52 is shaped to bear against end cap 24 so that upon replacement of end cap 24 combination gear subassemblies 50 are captured in place within the housing.

Figure 7:
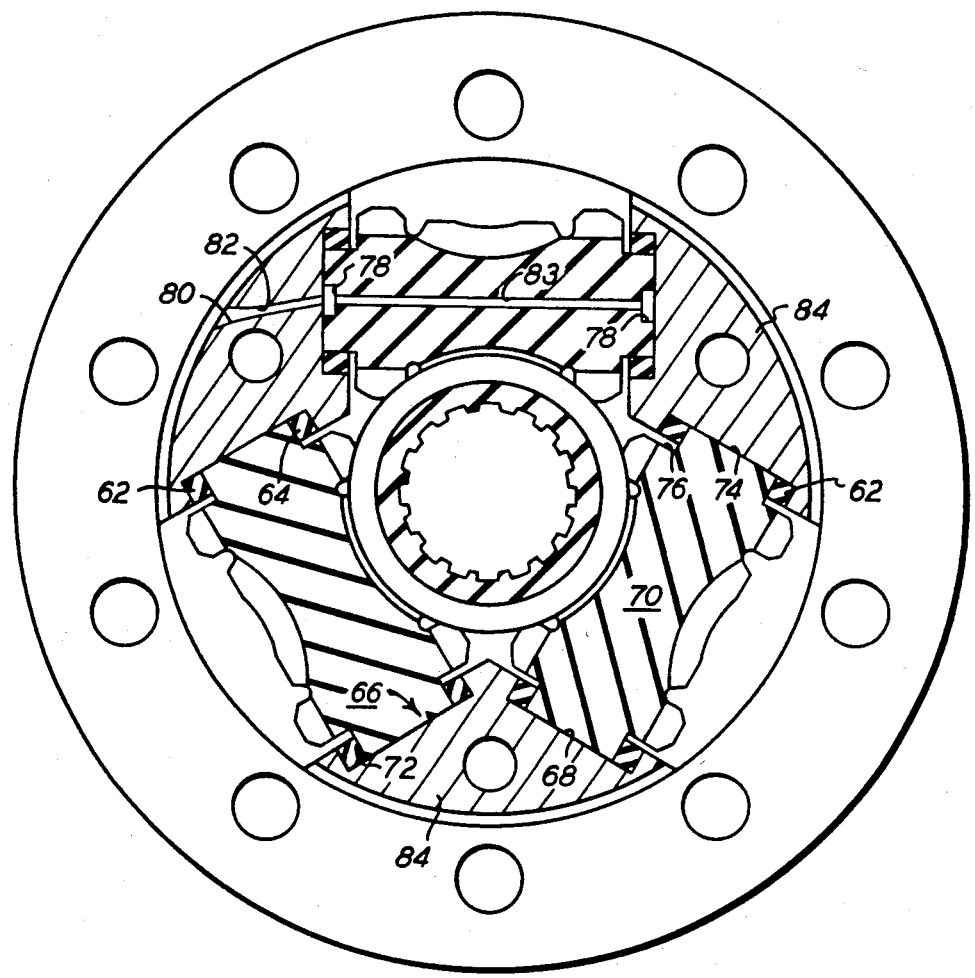
FIG. 7 is an end view of the second embodiment of the invention partly in cross section as seen in a plane similar to the one indicated by line 4—4 of FIG. 1.
Figure 8:
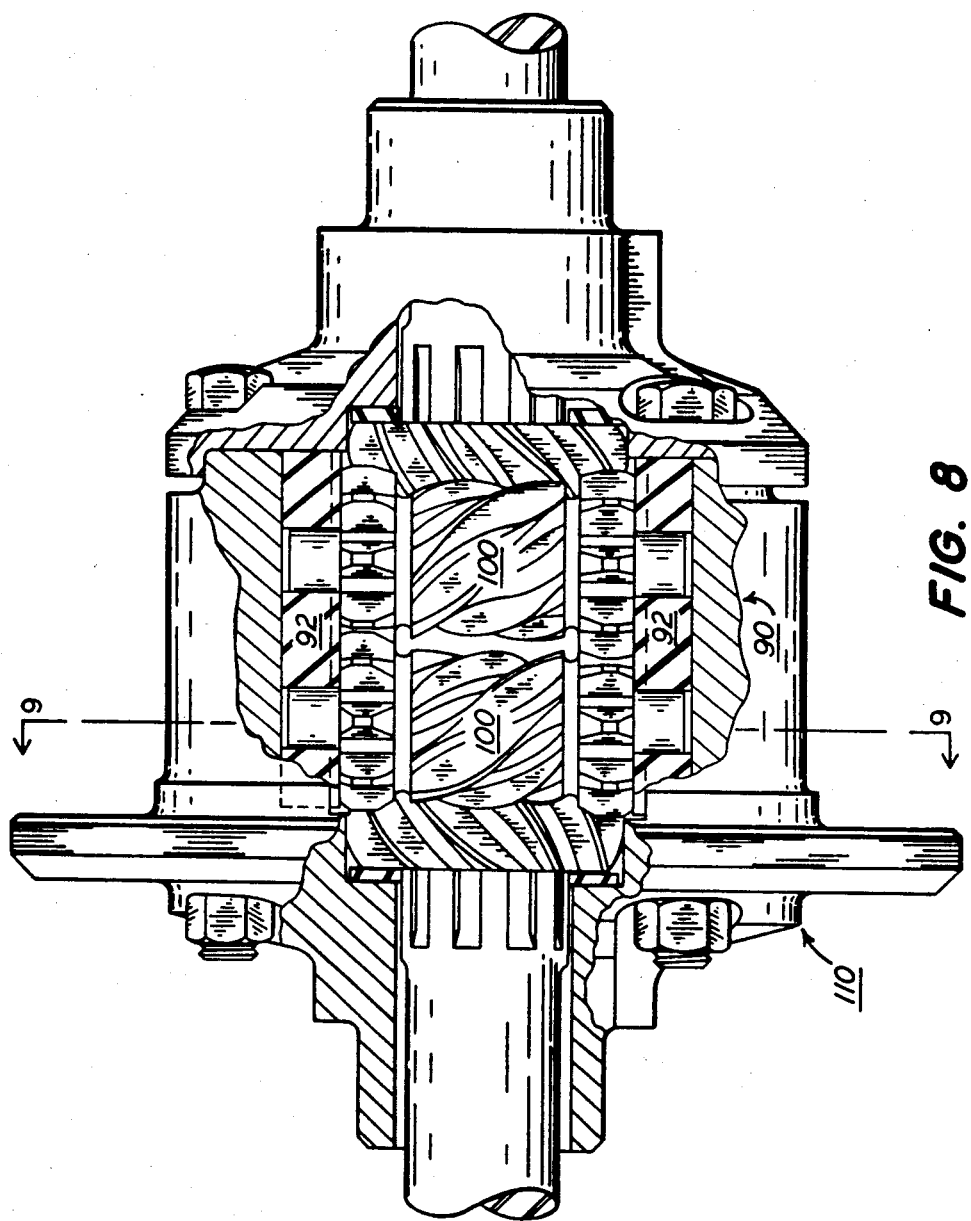
FIG. 8 is a cut away elevation view of the third embodiment of the differential assembly of the present invention.

A second embodiment using a similar combination gear subassembly 60 is illustrated by FIG. 7. In contrast to the first embodiment, however, journal plates 62 are slightly reduced in thickness with respect to the length of journals 72 to permit end surfaces 74 of the journals to seat against the bottom surface 68 of guide slots 66 while mounted in place. In this way, end surfaces 74 of journals 72 are arranged as thrust surfaces against the housing for restricting endwise movement of the combination gears. Also, it is especially important with respect to this embodiment that journals 72 are sized in diameter to encompass a major portion of end faces 76 of combination gears 70 to provide appropriate thrust bearing area for journal end surfaces 74.

A system for adding lubricant to bearing areas of the journal assemblies is also illustrated with the embodiment of FIG. 7. (Although this system is shown passing through a single pedestal of FIG. 7, a similar system is contemplated for each remaining pedestal.) Inlets 80 are provided at the outer circumference of pedestals 84 for gathering lubricant into conduit 82 which channels the lubricant through the pedestals and into pockets 78. The lubricant is then dispersed from pockets 78 over end surfaces 74 and through bearing surfaces 64. A further conduit 83 is provided to carry lubricant through the combination gear body to pockets 78 formed in the opposite end surface of the combination gear journal.

A third embodiment representative of the present invention is illustrated in FIGS. 8 through 11. An alternative combination gear subassembly 90 is comprised of a pair of T-shaped journal plates 92 (shown in isometric view in FIG. 11) for supporting and accurately locating a pair of enmeshed combination gears 100 within a differential housing 110. T-shaped journal plate 92 includes (a) a thin peripheral portion 94 which serves as a thrust washer between combination gear 100 and housing 110, and (b) a center portion 96 of increased thickness with respect to the peripheral portion for reinforcing bearing surfaces 98 along the length of journal plate 92.

Housing 110 is adapted to receive T-shaped journal plates 92 in guide slots 116 (FIG. 10) formed in opposing parallel faces 114 of adjacent pedestals 112. Slots 116 are sized to receive the center portion 96 of T-shaped journal plates 92 in a predetermined position with respect to housing 110. Journal plate center portions 96 are made of increased thickness along most of the length of the journal plates to provide maximum reinforcement for journal plate bearing surfaces 98 while rigidly supporting and accurately locating journals 102 (FIG. 9) of combination gears 100 in housing 110.

T-shaped journal plate 92 may be used with combination gears having journal ends formed either integrally with the combination gear or as part of a mounting shaft which passes through a bore in the combination gear. In either case, however, the journals are limited in diameter with respect to end faces of combination gears from which they emerge to preserve a major portion of those faces for use as thrust surfaces to restrict endwise movement of the combination gears.

Figure 9:
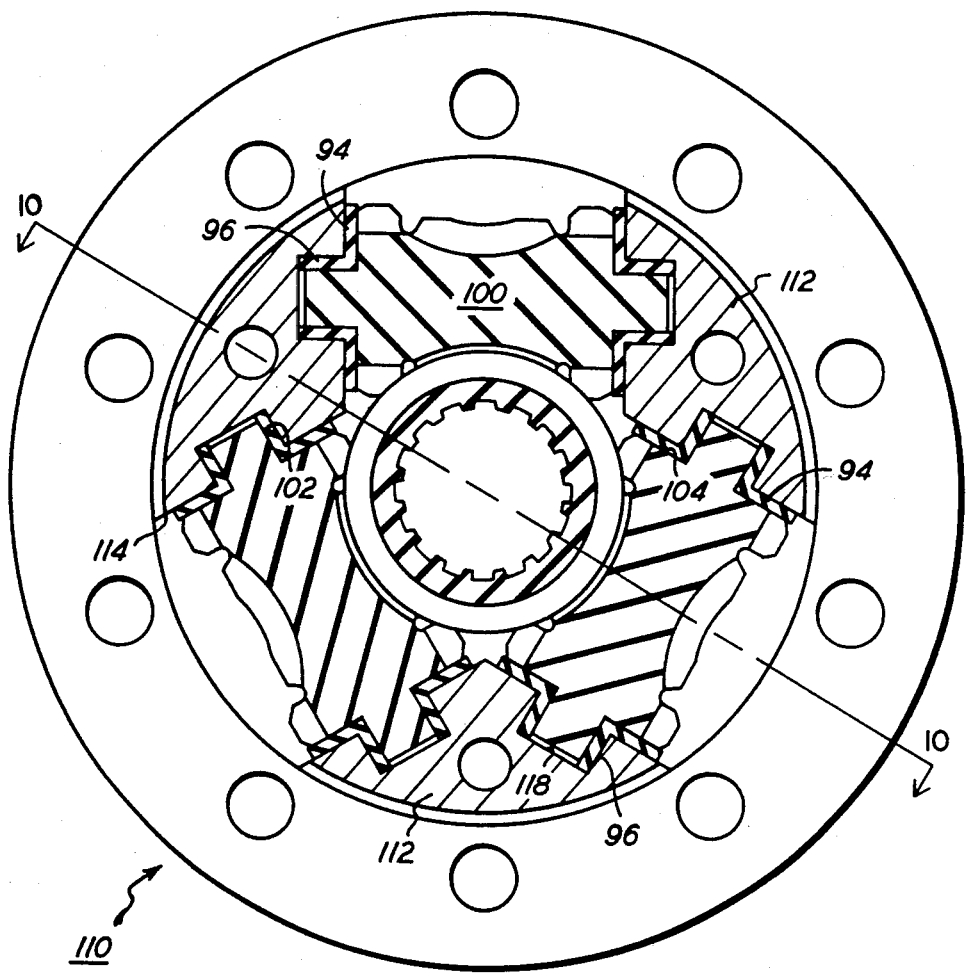
FIG. 9 is an end view partly in cross section of the third embodiment as seen in a plane indicated by line 9—9 of FIG. 8.

For example, journals 102 are shown in FIG. 9 as integral parts combination gears 100. End faces 104 of combination gears 100 are arranged as thrust surfaces for limiting axial movement of the combination gears. Journal plate peripheral portions 94 serve as a thrust washers between combination gear end faces 104 and opposing faces 114 of pedestals 112. It should also be noted that a measure of clearance is provided between ends of journals 102 and slot bottom surface 118 to assure that axial thrust load is carried by end faces 104.

Figure 12:
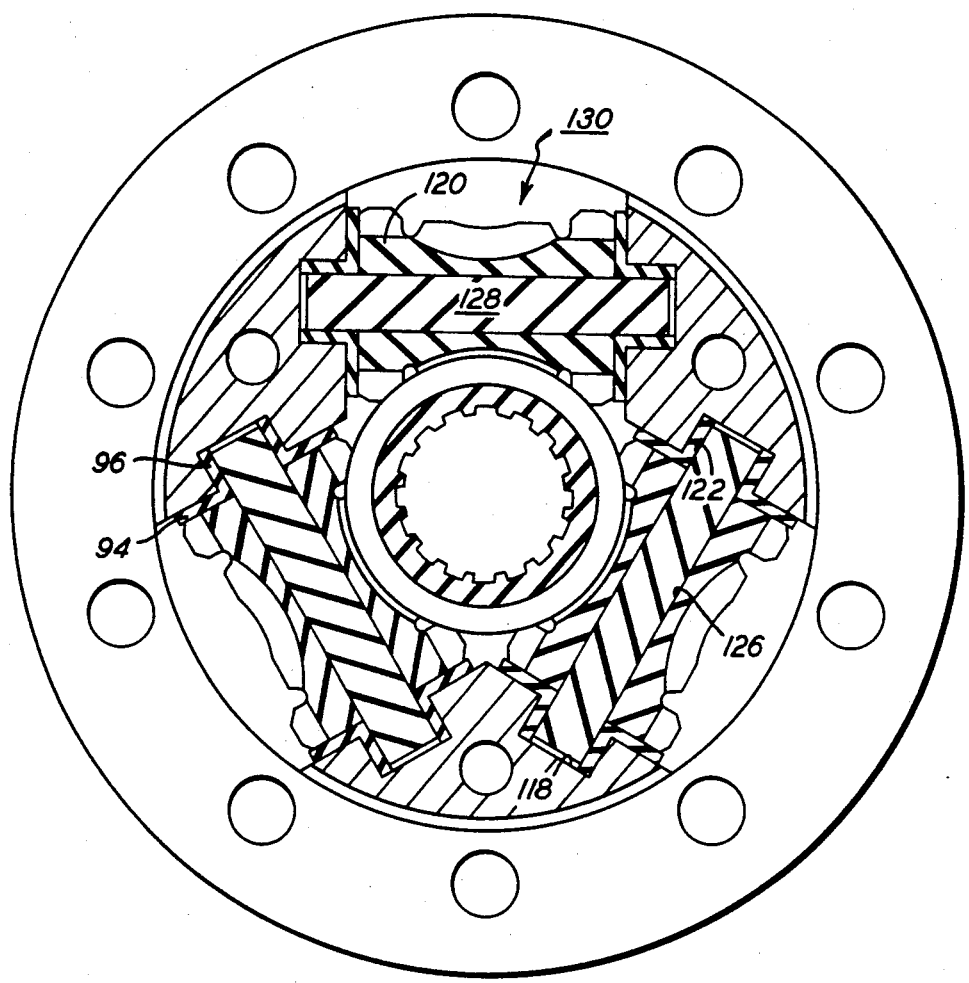
FIG. 12 is an end view of the fourth embodiment of the invention partly in cross section as seen in a plane similar to the one indicated by line 9—9 of FIG. 8.

In a fourth embodiment, shown in FIG. 12, journal plates 92 are used to support combination gears 120 of combination gear subassembly 130. The combination gears are shown in association with journals 122 formed at protruding ends of mounting shafts 128 which pass through bores 126 in the combination gears. In this example, axial movement of combination gears 120 is restrained by journal plate 92 whereas axial movement of the separate mounting shafts 128 is restrained directly by guide slot bottom surface 118.

Although the present invention has been described with respect to a few distinct embodiments, it may be appreciated in light of the above description that many more combinations of the same elements are also suggested. For example, a separate mounting shaft for rotatively supporting combination gears may be used with either a flat or T-shaped journal plate and a lubricant delivery system may be used with any of the above embodiments. It may also be appreciated that many other variations including those of design, dimension and geometry can be made in the basic concepts which have been disclosed. All such variations as would be obvious to a person skilled in the art or which would be equivalent to those described herein are intended to be included within the scope of claims which follow.

What is claimed is:

1. In a differential assembly of the type which includes a housing having means for receiving axle ends together with a pair of side gears coupled to said axle ends for rotation therewith and pairs of combinations gears each operatively connecting said side gears to each other and to said housing, said housing including an intermediate portion and two end portions, said intermediate portion defining pedestals connecting said end portions of said housing, one of said two end portions defining a removable cap fastened to said pedestals, said pedestals being spcaed apart from each other and having substantially paralled opposing faces for receiving said pairs of combination gears, the improvement comprising:

two pairs of journal plates, each of said pairs of combination gears being mounted between one of said pairs of journal plates, journals being located at opposite ends of said combination gears, each of said journal plates having a pair of bearings formed therein for receiving said journals, each of said pedestals defining guide slots formed in said parallel faces along the length of said pedestals, said guide slots being defined by a recessed bottom surface and two side walls which extend along the length of said pedestals, and each of said journal plates being received in one of said guide slots between said side walls for supporting said combination gears in said housing.

2. The differential of claim 1 wherein each of said pairs of combination gears mounted between one of said pairs of journal plates defines a combination gear subassembly and each combination gear subassembly is independently insertable through one end of said housing and secured in place by replacing said removable end cap.

3. The differential assembly of claim 2 wherein said journal plates are sized to serve as thrust washers between end faces of said combination gears and bottom surfaces of said guide slots for restricting endwise movement of said combination gears.

4. The differential assembly of claim 3 wherein said journals are integral with said combination gears.

5. The differential assembly of claim 2 wherein end surfaces of said journals are sized to form thrust surfaces against bottom surfaces of said guide slots for restricting endwise movement of said combination gears.

6. The differential assembly of claim 5 wherein said journals are integral with said combination gears.

7. The differential assembly of claim 6 wherein pockets are formed in said end surfaces of said journals for accumulating and dispersing lubricant on said end surfaces.

8. The differential assembly of claim 7 including conduits formed in said pedestals for delivering lubricant to said pockets.

9. The differential of claim 2 wherein an outer profile surface and said bearings of said journal plates are formed from sheet material by a stamping process.

10. The differential of claim 9 wherein said journal plates are treated with a metalurgical process for improving friction and wear characteristics.

11. The differential assembly of claim 2 wherein said journal plates are "T-shaped" in cross-section and include a thin peripheral portion which serves as a thrust washer between end faces of said combination gears and said parallel faces of said pedestals for restricting axial movement of said combination gears.

12. The differential assembly of claim 11 wherein said journal plates include a center portion of increased thickness over said peripheral portion, and said center portion is received in said guide slots for supporting and locating said journals within said slots.

13. The differential assembly of claim 12 wherein said journals are integral with said combination gears.

14. The differential assembly of claim 12 wherein said combination gears include through bores and said journals are defined at ends of mounting shafts which extend through said bores.

* * * * *